Jan. 5, 1943. G. MUFFLY Re. 22,245

REFRIGERATING MECHANISM

Original Filed May 25, 1937 3 Sheets-Sheet 1

INVENTOR
Glenn Muffly.
BY
Harness, Dickey & Pierce
ATTORNEYS

Jan. 5, 1943. G. MUFFLY Re. 22,245

REFRIGERATING MECHANISM

Original Filed May 25, 1937 3 Sheets-Sheet 2

INVENTOR
Glenn Muffly.
BY
Harness, Dickey & Pierce.
ATTORNEYS.

Jan. 5, 1943. G. MUFFLY Re. 22,245
REFRIGERATING MECHANISM
Original Filed May 25, 1937 3 Sheets-Sheet 3
FIG. 8.
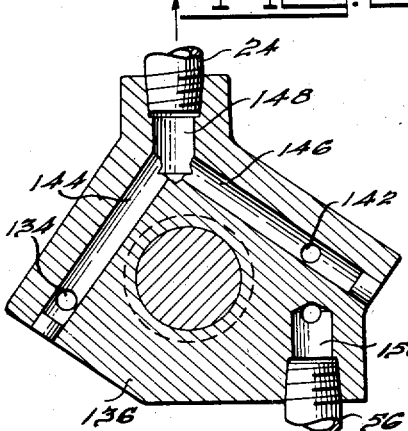
FIG. 10.
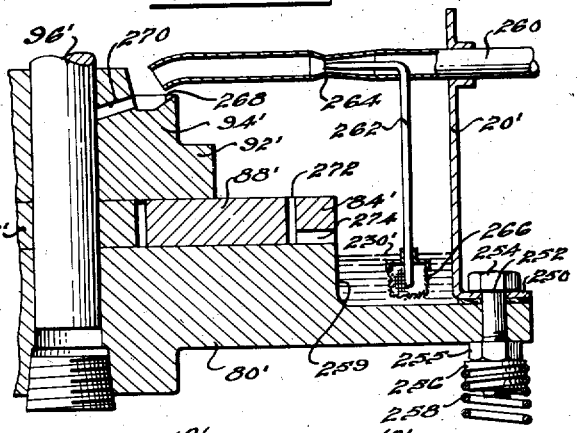
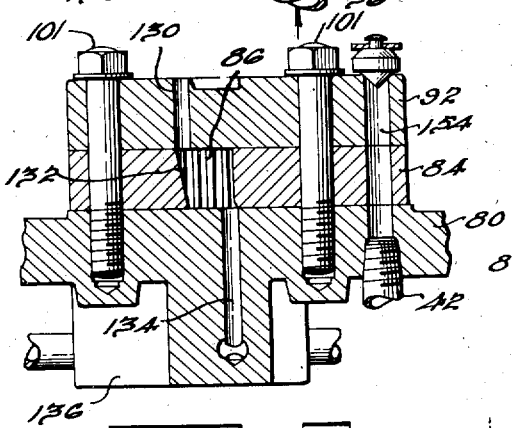
FIG. 7.
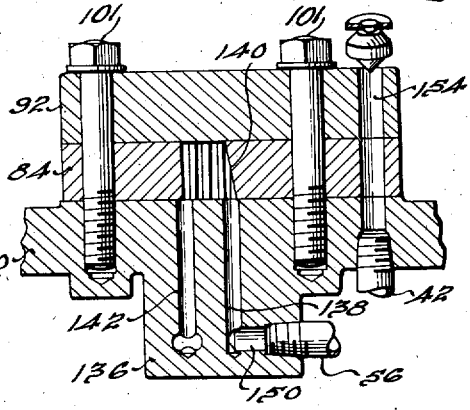
FIG. 9.
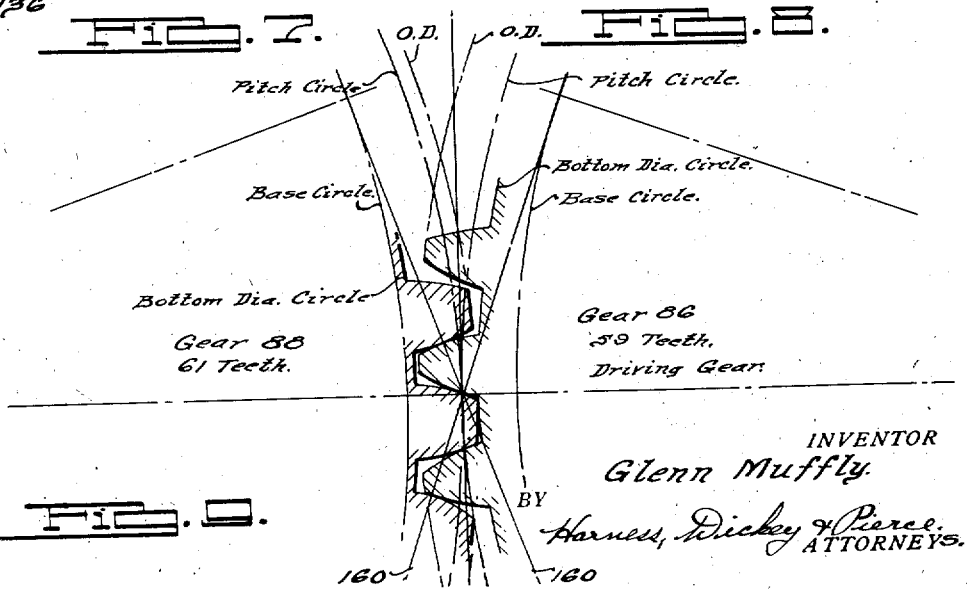
INVENTOR
Glenn Muffly.
BY
Harness, Dickey & Pierce.
ATTORNEYS.

Reissued Jan. 5, 1943

Re. 22,245

UNITED STATES PATENT OFFICE 22,245

REFRIGERATING MECHANISM

Glenn Muffly, Springfield, Ohio

Original No. 2,295,124, dated September 8, 1942, Serial No. 144,698, May 25, 1937. Application for reissue November 3, 1942, Serial No. 464,350

17 Claims. (Cl. 62—116)

This invention relates to refrigerating mechanism and has for its principal object the provision of a mechanism of this type that is simple in construction, efficient in operation and economical to produce.

Other objects of the invention include the provision of a sealed type of refrigeration unit embodying certain novel features of construction; the provision of a refrigerating mechanism including a rotary type of pumping mechanism arranged in sealed relation with respect to the driving motor therefor and provided with a pair of independent suction passages one of which is open to the interior of the sealed unit; the provision of a refrigerating mechanism including a refrigerant circuit at least part of which comprises a plurality of refrigerant paths connected in parallel and a novel form of means for alternately opening and closing said paths to the flow of refrigerant therethrough; the provision of a refrigerating mechanism as above described in which the controlling means for the parallel paths of refrigerant flow are contained within a sealed refrigerant motor-compressor unit; the provision of a refrigerating mechanism including a refrigerant circulatory system at least part of which comprises a plurality of refrigerant flow paths connected in parallel and fed with refrigerant through a single expansion valve together with means for maintaining the suction pressure in one of the parallel flow paths at a lower value than in another thereof; the provision of a refrigerating mechanism having a novel form of means associated therewith serving to provide a compressor unloading effect therefor whereby to enable a smaller driving motor to be utilized than would otherwise be possible; and the provision of a new and novel form of oiling mechanism for a refrigerant compressor unit.

Further objects of the invention include the provision of a new and novel form of rotary compressor mechanism for a refrigerating apparatus; the provision of a new and novel form of gear pump; the provision of a refrigerant compressor including a gear pump having involute teeth and so constructed and arranged as to provide a pump of high efficiency that is economical to manufacture; the provision of a gear pump particularly for refrigerating mechanism providing a plurality of independent suction passages capable of operating under different suction pressures, and a common discharge passage; the provision of a gear pump particularly adapted for the compression of gases including gears having a novel form of co-operating teeth thereon; and the provision of a gear pump so constructed and arranged as to provide for maximum accuracy in engagement of the gears with each other and with their housing with a minimum amount of machining.

The above being among the objects of the present invention, the same consists in certain novel features of construction and combinations of parts to be hereinafter described with reference to the accompanying drawings, and then claimed, having the above and other objects in view.

In the accompanying drawings which illustrate a suitable embodiment of the present invention and in which like numerals refer to like parts throughout the several different views:

Fig. 6 is an enlarged horizontal sectional view taken on the line 6—6 of Fig. 2, illustrating inlet and outlet passages for the pump mechanism located in the unit;

Fig. 7 is an enlarged fragmentary vertical sectional view taken on the line 7—7 of Fig. 4;

Fig. 8 is an enlarged fragmentary vertical sectional view taken on the line 8—8 of Fig. 4;

Fig. 9 is a more or less diagrammatic view illustrating in greater detail the particular shape and arrangement of the teeth of the gears in the compressor unit; and, Fig. 10 is a fragmentary, vertical sectional view of a modified form of construction.

Figure 1:
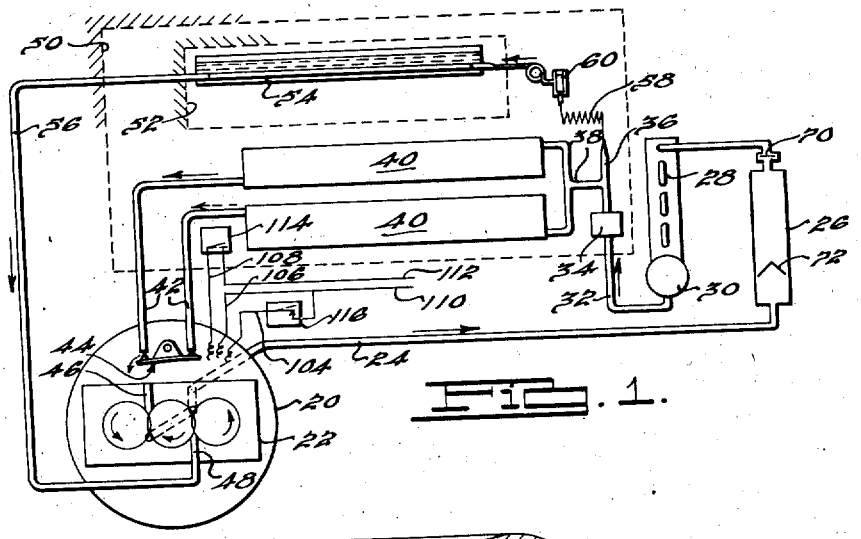
Figure 1 is a more or less diagrammatic view of a refrigerating mechanism embodying features of the present invention.

Although certain features of the present invention are applicable to refrigerating systems of more or less conventional type, certain features thereof in particular are specially adapted for use in connection with refrigerating systems of the type shown in my Letters Patent of the United States for improvements in Refrigerating mechanism, Nos. 2,145,773; 2,145,774; 2,145,775, and 2,145,777, all issued January 31, 1939. In my above identified patents means are shown provided for alternately refrigerating different groups of ice making surfaces whereby to cause ice to be formed alternately by said groups and which ice is adapted to be melted free of its surfaces during that time when it is not being refrigerated and during which time another group of ice making surfaces is being refrigerated. In my above identified patents these ice making surfaces are positioned within an insulated cabinet wherein the air within the cabinet is adapted to contact a water tank and certain of the refrigerated surfaces of the mechanism and to be cooled to a desirable degree thereby for the proper preservation of food stuffs within the cabinet.

Additionally in my above identified patents the refrigerant passing through the evaporator associated with surfaces being refrigerated at any particular moment is shown as also passing through an evaporator associated with a chamber positioned within the refrigerator cabinet and itself insulated against exchange of heat with the bulk of the air within the cabinet whereby to provide a sub-freezing chamber or the like. In accordance with the present invention the alternately refrigerated evaporators of a similar ice maker are similarly positioned to also cool the air within the cabinet but instead of employing the refrigerant passing therethrough to produce a refrigerating effect in a sub-freezing chamber within the cabinet, a refrigerant path of flow parallel to the path of flow to the ice maker is provided for the sharp freezing (sub-freezing) chamber and, as in my prior constructions, the sharp freezing chamber is preferably itself insulated from the exchange of heat between the air within it and that contained generally within the main food storage space of the refrigerator cabinet.

In order to more fully explain this system reference may be had to Fig. 1 in which the numeral 20 represents the housing of a sealed motor-compressor unit enclosing a suitable pump mechanism generally indicated at 22 which, in the broader aspects of the present invention, may be of any suitable type but a specific form of which is more fully described in connection with the remaining views and forms an important feature of the present invention. The pump 22 is provided with a single refrigerant discharge line 24 which leads into the bottom of a container 26 the upper end of which is connected to a conventional type of condenser 28 provided with a conventional receiver 30 at its lower edge. A tube 32 connects the receiver 30 with a single expansion valve 34. Although the discharge side of the expansion valve 34 may be connected to any suitable evaporator suitably arranged in co-operative relation with respect to a water container for causing ice to be formed therein, or employed for any other purpose, in order to illustrate the application of the present invention to structures of the general type disclosed in my above identified patents, the expansion valve 34 is shown as being connected by a tube 36 and a suitable branch tube 38 with a pair of evaporators and associated water container indicated diagrammatically at 40 arranged to provide parallel refrigerant flow paths and each of which may be assumed to be associated with a corresponding group of ice making surfaces for the purpose of freezing the water into ice. Each of the evaporators 40 is provided with a discharge duct 42 each of which terminates independently of the other thereof within the housing 20.

Within the housing 20 a valve mechanism indicated generally at 44 in Fig. 1 is provided for alternately closing the discharge ends of the tubes 42 to the flow of refrigerant therethrough and suitable mechanism is provided as will hereinafter be specifically described in connection with other views of the drawings for operating the valve mechanism 44 at timed intervals to alternately close and open the ducts 42 thereby to render the evaporator connected with the closed duct inoperative for refrigerating purposes and rendering the evaporator 40 connected with the open duct open to the flow of refrigerant therethrough and thereby operative for refrigerating purposes. As previously mentioned the compressor 22 is provided with a pair of independent suction ports one of which is open to the interior of the housing 20 and acts to withdraw refrigerant from the interior of the housing 20 and consequently from that evaporator then opened into the interior thereof, such refrigerant being drawn into the pump 22 to be compressed and then discharged through the outlet duct or discharge line 24.

It will be understood that the evaporators 40 are positioned within an insulated cabinet indicated at 50 and exposed to contact with the air therein for the purpose of cooling such air thereby to preserve food stuffs contained in the cabinet. Within the cabinet is a smaller insulated chamber 52 within which is positioned an evaporator 54 connected by a tube 56 with the other and remaining suction passage of the pump 22. The inlet side of the evaporator 54 is connected with the duct 36 on the discharge side of the expansion valve 34 through a pressure reducing device which may conveniently be either a capillary tube 58 or a weighted valve device 60, both being shown connected in series in Fig. 1 merely as a matter of illustration as either one or the other thereof will be employed, but not necessarily both at one time. The weighted valve is preferred as it always imposes a predetermined additional pressure reduction to the evaporator 54.

With the construction thus far described it will be understood that refrigerant fed through the single expansion valve 34 is fed to either one or the other of the evaporators 40 as well as to the evaporator 54 and in view of the fact that the pump 22, as will hereinafter be more fully described, is constructed to subject the evaporators 40 to a suction pressure entirely independently of the suction pressure applied to the evaporator 54 and, because of the restriction 58 or 60 in the feed line to the evaporator 54, the suction pressure of the pump applied to the evaporator 54 will be lower than that applied to the evaporators 40 and consequently the evaporator 54 will be maintained at a lower temperature than the temperature of the evaporators 40 thereby to permit the interior of the chamber 52 to be maintained at a substantially lower temperature than the interior of the cabinet 50. As a matter of illustration it may be assumed that the temperature of the chamber 52 may be maintained somewhere between zero and plus 10° F., that the interior of the cabinet 50 may be maintained at a temperature somewhere between 40° to 45° F. and that the evaporators 40 will be maintained during their respective refrigerated periods at a temperature of somewhere between plus 15 and 25° F. and that the evaporator 40 not being refrigerated and being warmed by the air in the cabinet 50 is somewhere between the temperatures of 32° and 45° F. It will thus be apparent that by the employment of a simple restricting device such as the capillary tube 58 or the weighted valve 60 evaporators may be connected in parallel in the same system and with the use of a single expansion valve evaporators may be maintained at different operative temperatures. It may be observed, however, that this is only possible where it is also possible to maintain the suction pressures on the various evaporators at different values.

Another feature of the present invention is the provision of the chamber 26 between the outlet side of the compressor 22 and the condenser 28. The chamber 26 is provided with a check valve 70 in its discharge side permitting flow of fluid through it towards the condenser 28 only. When the pump 22 stops at the end of each cycle of operation the refrigerant under pressure in the discharge line 24 and container 26 will gradually be equalized with the low pressure side of the refrigerating system due to reverse rotation of and leakage through the pump 22 which is not equipped with valves, but the high pressure refrigerant in the condenser 28 and receiver 30 will be prevented from being transmitted into the container 26 and housing 20 by the check valve 70. Consequently at the beginning of the next cycle of operation of the pump 22 it will be initially pumping against a pressure substantially equivalent to that in the suction or lower pressure side of the system and there will be substantially no head for the pump to pump against upon initiation of operation. By suitably proportioning the chamber 26 to obtain the required volume assurance may be had that the motor driving the pump 22 will reach its normal speed of operation prior to a material or a normal operating pressure existing in the discharge line 24. Shortly after the pump 22 has attained its normal speed of operation, if the chamber 26 is properly proportioned, the pressure of the compressed refrigerant in the discharge line 24 will equal that in the high side of the system after which the check valve 70 will lift and normal operation of the system will begin. The effect of the construction is, however, as will be readily understood by those skilled in the art, to serve the same purpose as the usual compressor unloader found in refrigerating mechanisms and provided for the purpose of permitting the motor which drives the pump to attain its normal or substantially normal speed before the full burden of the pumping operation is placed upon it. The provision of such a means is of advantage in that a motor is not required to develop the torque that it would otherwise have to develop if immediately subjected to the pressure of the high side of the system upon initiation of its driving movement. The result is that a less expensive motor may be employed with equally satisfactory results. It may be noted, incidentally, at this point, that if desired an oil baffle such as 72 may be included in the chamber 26 for the purpose of reducing the otherwise normal flow of lubricating oil with the refrigerant flowing through the evaporators, the oil separated out in such case being carried back into the pump 22 during inoperative periods of the pump, due to the pressure equalizing action above described.

Figure 2:
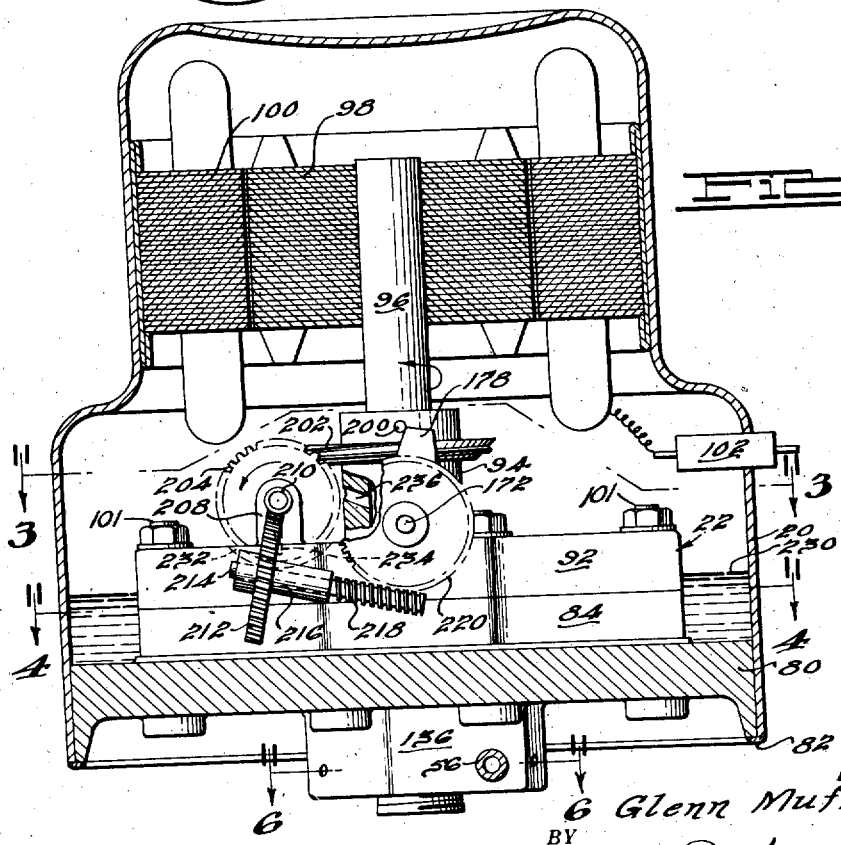
Fig. 2 is an enlarged partially broken, vertical sectional view taken centrally through a motor compressor unit constructed in accordance with the present invention and of the type adapted for use in the refrigerating system illustrated in Fig. 1.
Figure 4:
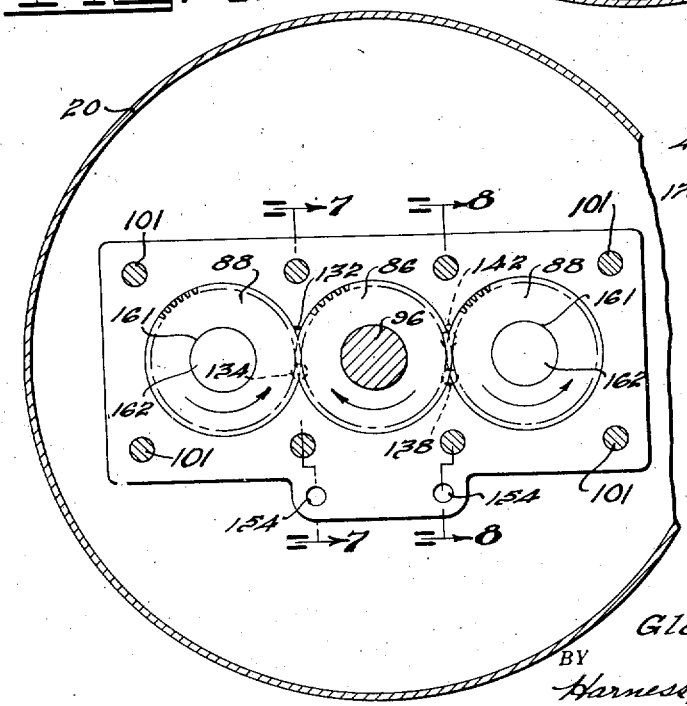
Fig. 4 is a transverse sectional view taken on the line 4—4 of Fig. 2.

Referring now to the remaining figures in the drawings and particularly to Fig. 2 it will be noted that the compressor unit includes the inverted generally cup-shaped pressed metal housing 20, the lower end of which is closed by the round base member 80 of the pump 22 and which is hermetically sealed thereto as by welding along the aligned lower edges thereof as at 82, or otherwise. Within the housing 20 and seated upon the base 80 is an intermediate pump body section 84 provided with three cylindrical openings therethrough preferably arranged with their axes in a common plane as shown in Fig. 4 and with adjacent peripheral portions of adjacent openings in intersecting relation, the central opening containing a gear 86 and the opposite end openings containing the gears 88. Overlying the intermediate pump body portion 84 is a cap member 92 provided with an upwardly extending hollow boss 94 concentric with the gear 86 and the opening therefor and serving to rotatably receive therein an upwardly extending shaft 96 the lower end of which is suitably fixed with respect to the gear 86 for transmitting driving movement thereto and the upper end of which has suitably fixed thereto the rotor 98 of an electric motor having a stator 100, the stator 100 being suitably received and secured within the upper and reduced end portion of the housing 20 as by a press fit therein. Studs 101 threaded into the base plate 80 and extending through the pump body 84 and cover plate 92 serve to secure these parts together.

The leads to the electric motor are carried through suitable connections indicated at 102 in Fig. 2 extending out through the walls of the housing 20 and hermetically sealed thereto in a conventional manner to prevent leakage of gas thereabout. As indicated in Fig. 1 and in accordance with conventional practice three leads, namely 104, 106 and 108 are provided for the motor 98—100, the leads 106 and 108 being connected to conventional power lines 110 and 112 through a conventional thermostatic switch structure 114 arranged within the cabinet 50 and operated by variations in temperature therein for the purpose of controlling the cyclic operation of the compressor unit. The lead 104 which extends to a suitable starting-winding circuit (not shown) extends through a starting circuit breaker 116 in accordance with conventional practice and then to one of the power lines 110 or 112.

It will be understood that the gears 86 and 88 lie in meshing relationship. The arrangement of the three gears 86 and 88 is such as to provide two independent gear pumps as far as suction effect is concerned. In other words the gear 86 and either one of the two gears 88 co-operate to form a gear pump in accordance with conventional gear pump practice and the gear 86 co-operates with the other gear 88 to provide a different gear pump in accordance with conventional practice, except that the two pumps intermingle their discharges and are, therefore, to be considered as one pump on the discharge side. Referring particularly to Fig. 4 if the gears are turning in the direction of the arrows indicated gas or other fluid will enter into the spaces between the gear teeth of the gears 86 and 88 at the point where the teeth of these gears are drawn out of meshing relationship with respect to each other and will be carried around the outer peripheries of the gears, that portion of the fluid trapped between the teeth of the gears 88 being carried completely around the gears in a counterclockwise direction and being squeezed out from between the gears 88 and the gear 86 at the points where the teeth on the gears come into mesh with each other. The gas trapped between the teeth of the gear 86 as such teeth leave meshing relationship with the teeth of one of the gears 88 will be carried around in a clockwise direction as viewed in Fig. 4 and will be squeezed out therefrom at the point where the teeth of the gear 86 mesh with the teeth of the other gear 88. Consequently with a gear pump of the type shown while the gear 86 and one of the gears 88 co-operate to provide a suction inlet which is entirely independent of the suction inlet formed between the gear 86 and the other gear 88, nevertheless the fluid which is drawn into the inlet formed between the gear 86 and one gear 88 will be carried around commingled with the gas or other fluid which is drawn into the inlet between the gear 86 and the other gear 88 and consequently there would be no particular point in attempting to separate the discharge ports 134 and 142. In accordance with the above a suction inlet for the pump comprising the gear 86 and one gear 88 is formed by a drilled passage 130 drilled downwardly through the upper casting 92 of the pump, as indicated in Fig. 7, and meets the top wall of the pump body 84 at the point where the walls of the openings in the body 84 for the gears 86 and 88 intersect above the plane of the gear axes as viewed in Fig. 4 and this point of intersection of these walls is beveled off as indicated at 132 in Figs. 4 and 7 to provide an ample path for the flow of fluid over the full width of the teeth of the gears 86 and 88 at this point. Inasmuch as the passage 130 is open to the inside of the housing 20, the opening 130 may be made as large as desired and may even be enlarged to the extent of eliminating all of that part of the top plate 92 except immediately over the area where the teeth of the associated gear 88 begin to and actually mesh with the teeth of the gear 86 as will hereinafter be brought out in connection with Fig. 10. Likewise such part of the body 84 surrounding such gear 88 not required for bearing on the periphery of the gear to maintain it in place may also be eliminated. The opposite point of intersection of the walls of the openings in which the gears 86 and 88 are received is open to a blind opening 134 drilled downwardly in the bottom plate 80 of the pump and which terminates adjacent the lower end of a downwardly projecting boss 136 formed centrally of the bottom plate 80. The point where the walls of the openings for the gear 86 and the other gear 88 in the chamber plate 84 intersect adjacent the point where the teeth of these gears 86 and 88 leave meshing relationship with respect to each other when turning in the direction indicated in Fig. 4 is open to a blind opening 138, best shown in Figs. 4 and 8 drilled downwardly in the bottom plate 80 of the pump to a point adjacent the lower face of the boss 136 and which thus serve as the second suction inlet for the pump. As in the case of the inlet 130 for the pump formed by the first pair of gears 86 and 88 the body at the point where the walls of the openings therein for the gear 86 and the other gear 88 meet in alignment with the outlet passage 138 is beveled off as at 140 to permit access of fluid entering through the inlet passage 138 over the full width of the teeth of the gears.

The discharge side of the pump formed by the gears 86 and 88 provided at the points where the teeth of these gears enter meshing relationship with respect to each other when rotating in the direction shown in Fig. 4 is provided with outlets in the form of blind openings 134 and 142 drilled downwardly in the base plate 80 to points adjacent the lower end of the boss 136 as best brought out in Figs. 4, 7, and 8. As indicated in Fig. 6 within the lower portion of the boss 136 the lower ends of the discharge passages 134 and 142 are connected together by a pair of convergent horizontally directed passages 144 and 146, respectively, to a common outlet passage 148 connected in the particular illustration shown to the discharge line 24 previously described. The suction connection 138 for the pump formed by the gear 86 and the righthand gear 88 is connected in the lower portion of the boss 136 with a transverse passage 150 suitably connected in the case illustrated with a suction line 56 for the evaporator 54. Because of the fact that the suction passage 130 for the pump extends upwardly through the cover plate 92 it will be apparent that it opens to the interior of the housing 20. The suction ducts 42 for the evaporators 40 open into the interior of the housing 20 independently of one another through suitable drilled passages 154 drilled upwardly through the base plate 80, body 84 and cover plate 92 of the pump and the lower ends of which are respectively connected to the suction lines 42 of the two evaporators 40. It will, accordingly, be understood in the construction shown that the refrigerant discharged from the evaporators 40 is carried into the interior of the housing 20 from which it is discharged through the intake passage 130 for the pump formed by one pair of the gears 86 and 88. The pump thus formed by these two gears provides means for impressing the suction side of the evaporators 40 with a suction pressure which may and will be in the construction shown under normal operating conditions different from and higher than the suction pressure which is impressed upon the discharge side of the evaporator 54 through the pump formed by the gear 86 and the other gear 88, refrigerant pumped by both of such pumps, however, commingling with each other in the pump and being discharged therefrom in a single stream by means of the passages best shown in Fig. 6. As previously mentioned this ability of the pump to provide for maintaining two entirely independent suction pressures of different values enables the evaporator 54 to be maintained under a normally lower temperature than that at which one or the other of the evaporators 40 is maintained.

The pump thus described is novel in further respects than those heretofore brought out. For instance it will be noted that the gears 88 are not provided with a shaft or journal about which they operate as in conventional constructions. These gears are each provided with a central opening 161 but these openings are fully closed by means of suitable plugs 162 which completely eliminate the possibility of gaseous refrigerant being entrapped therein. The holes 161 are provided in the gears 88 only for the purpose of ease in manufacturing and once the gear is finished, the holes being no longer necessary for its operation they are plugged as described. The gears 88 are maintained in proper meshing relationship with respect to the gear 86 by peripherally bearing against the walls of the corresponding openings in the body 84 and for this purpose such openings are made a fairly accurate fit with respect to the circumferences of the gears 88 and the teeth of the gears 88 are provided with unusually wide lands as indicated in Fig. 9, which thus provide ample bearing areas between the peripheries of the gears and the walls of the openings in which they are received. The elimination of the shaft or journal for the gears 88 not only makes the pump more economical to manufacture in lessening the number of parts and machine operations required, but the machine operations themselves are simplified and rendered more economical by reason of the elimination of the accurately aligned holes in the base plate 80 and top plate 92 which would otherwise be required for the shafts of gears 88 and this permits manufacturing tolerances in the construction shown to be maintained at wider limits than would otherwise be possible in quantity production.

The use of a gear type pump as a compressor is old, but in all past usages, as far as I am aware, the gear pumps designed for use as compressors have been at fault in being so designed that two mating gear teeth cannot possibly have involute curves throughout the length of their engagement.

Since the involute curve cannot extend below the base circle of a gear, it is obvious that in order to have an involute curve extend to the root of a tooth or anywhere nearly to the root of the tooth, the gear must have a large number of teeth or be designed with an unusually large pressure angle. A common proportion used in gear type compressors in the past has been a gear of 10 to 16 diametral pitch having ten or twelve teeth. In a 16 pitch gear, the depth of engagement between the two gears is ⅛ of an inch, or normally $\frac{1}{16}$ of an inch above and below the pitch circle on each gear. These gears would have pitch diameters of one inch or less, even when they are cut at a considerable helix angle. They have ordinarily been designed with a 14½° pressure angle, but even if the pressure angle were increased to 20°, we find that the base circle diameter of a gear having a one inch pitch diameter and a 20° pressure angle is only .9397″, which figure is the cosine of 20°, and the base circle diameter is the product of the pitch diameter and the cosine of the pressure angle.

With a gear of this type, the involute curve can extend only about .030″ below the pitch circle. As this is true of each gear, it provides a depth of only .060″ out of the total working depth of the teeth in which the mating teeth can possibly engage each other on involute curves.

Another fault of all gear pumps employed as refrigeration compressors in the past, as far as I am aware, is that the usual clearance commonly provided in all types of gearing has been allowed at the bottoms of tooth spaces. This clearance is provided for in the making of stock gear cutters and hobs, but is undesirable in a pump which is to be used for the purpose of compressing a gas because it leaves a "dead space" of compressed gas which cannot be forced out through the discharge port and the work performed upon which by compression is substantially lost.

A third fault which has been present in most of the gear type compressors designed thus far is the use of helical teeth. Inventors and designers have been under the impression that the helical teeth cause the gas to be forced lengthwise of a tooth space, and compressed at one end of the helical gear or at the middle of a herring-bone gear. This is an erroneous conception, the fallacy of which may be seen in considering a sectional view taken normal to the teeth of a pair of mating gears, having helical teeth. It will be seen that in addition to the clearance space at the bottom of each tooth space, there is a considerable passage allowed for flow of the gas longitudinally of a tooth space, even when both teeth are properly engaged with a tooth of the mating gear. This means that the gas, instead of being compressed toward the end at which it is to be discharged, is allowed to escape to the opposite end of the tooth spaces of the two mating gears, and there is considerable inefficiency in pumping for this reason.

In the design of the gears for the compressor shown herein the faults of previous designs in the above respects have been overcome by selecting proportions and sizes of gear teeth to provide involute curves throughout the full depths of driving contacts between teeth on each of the pair of gears; to provide for a minimum amount of clearance between the point of one tooth and the bottom of the space between teeth of the mating gear; in providing for an overlapping of the arcs of working contact of successive teeth; and in using straight spur gears instead of helical gears.

A simple mathematical formula for providing involute curves throughout the full depths of driving contacts between teeth on each of the pair of gears is that the base circle radius of either gear must not exceed the radial distance from the center of the gear to the point of intersection of the outside diameter of the gear mated therewith in running position and one of the internal tangents common to the base circles of the two gears. The two popular pressure angles used on gears are 14½° and 20°, and the cosine is smaller for the greater angle. The pair of gears 86 and 88 shown in detail in Fig. 9 are designed to accomplish the desired result. In this figure the base circle of the gear 88 shown at the left, has a smaller radius than the bottoms of tooth spaces or bottom diameter circle, putting the base circle inside of the bottom diameter circle. On the gear 86 at the right of Fig. 9, this condition is even more pronounced. The proportions selected for this view are fifty-nine teeth on the right hand or driving gear 86 and sixty-one teeth on the left hand or driven gear 88. The outside diameters of the two gears are the same, and they are assumed to have been cut with the same hob, which is specially designed to allow a minimum of clearance between the points of the teeth and the bottoms of the spaces between the teeth of the mating gear. Since the base circular pitch must be the same on the two gears, the base circle of the fifty-nine tooth gear 86 is $\frac{59}{61}$ of the base circle of the sixty-one tooth gear 88. The depth of teeth is the same on the two gears. Due to the large number of teeth there will be two or more pairs of teeth engaged in driving contact in one direction at all times, thus providing a seal against the flow of gas from the delivery side to the intake side between the meshing gears. This condition is mathematically impossible on gears of the proportions that have heretofore been used in gear type compressors designed for refrigerating systems. It is not necessary to go to the extreme illustrated by Fig. 9, but it is necessary that the base circle fall inside of the smallest circle at which a tooth contact is made on either gear. In other words, on either of the two straight lines 160 which form the internal tangents of the two base circles, there must always be one and there should be two or more points of driving contact between involute curves of mating teeth. In order to arrive at the number of teeth necessary to meet this requirement, and this regardless of whether the gears are of equal diameter, the base circular pitch, which must be identical in both gears, must be less than the length of that part of an internal tangent of the two base circles of the pair of mating gears cut off by the outside diameter circles of the two gears. It is desirable to have two teeth in working contact at all times which requires that the base circular pitch of the gears be less than half of the above defined portion of the internal tangent.

In the example shown in Fig. 9, the outside diameter of each gear blank is that of a normal sixty tooth gear. Because the driving gear 86 is cut with fifty-nine teeth, its base circle is reduced in diameter so that the tooth flanks are formed by parts of the involute curve considerably removed from the base circle. On the sixty-one tooth driven gear 88 shown at the left of Fig. 9, having an outside diameter which would be normal for a sixty tooth gear, the base circle is still inside of the bottom diameter circle in this example, but the tooth flanks are developed by portions of the involute curve which are much closer to the base circle. This means that during the process of generating the two gears from the same hob, the gear blanks are driven at different ratios to the hob rotation. When the two gears thus generated are engaged with each other, it will be found that the pitch circle of the sixty-one tooth gear 88 falls nearer to the outside diameter, whereas the pitch circle of the fifty-nine tooth gear 86 falls nearer to the bottom diameter.

The design of this pair of gears as before outlined would accomplish its purpose with either one of the two acting as the driver, but for the purpose of this design the fifty-nine tooth gear 86 is employed as the driver and the sixty-one tooth gear 88 as the driven gear for reasons previously described. It will be noted from Fig. 9 that the lands at the tops of teeth on the sixty-one tooth gear 88 are greater than the lands at the tops of the teeth on the fifty-nine tooth gear 86. This is a result of the method of generation previously explained.

Since the driving gear 86 has an odd number of teeth and the two driven gears 88 are identical with each other, it will be seen that the discharges of gas at the two points of the gears entering engagement will occur alternately. While this is not an essential of the design, it is desirable in providing a more continuous flow of compressed refrigerant to the condenser and breaking up the sound of gas discharges from the compressor. Likewise, the suction impulses occur alternately, there being 118 suction impulses in the two separate suction passages and 118 discharge impulses directed into the one discharge passage 148 leading to the condenser per revolution of gear 86.

Figure 3:
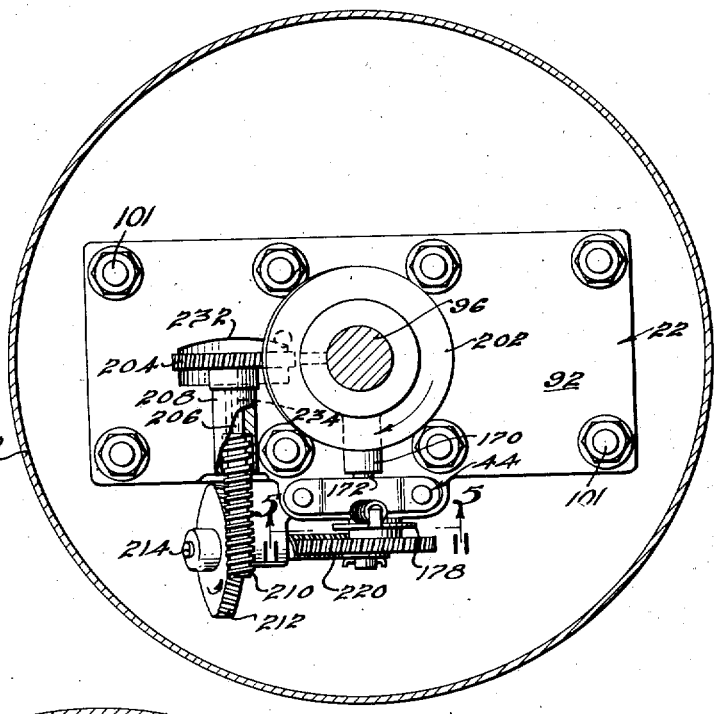
Fig. 3 is a partially broken transverse sectional view of the unit shown in Fig. 2 taken as on the line 3—3 thereof.
Figure 5:
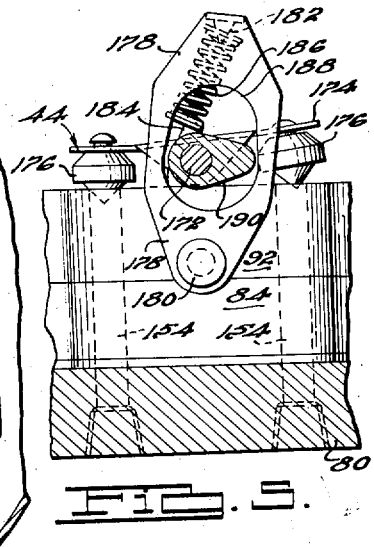
Fig. 5 is an enlarged fragmentary vertical sectional view taken on the line 5—5 of Fig. 3 and illustrating in greater detail the snap switch mechanism for alternately opening and closing parallel refrigerant flow paths of one portion of the system.

In order to operate the valve mechanism indicated generally at 44 in order to alternately open and close the suction lines 42 for the evaporators 40, the boss 94 for the top plate 92 of the pump is provided with a laterally extending boss 170 best shown in Fig. 3. A shaft 172 arranged with its axis in perpendicular relationship to the axis of the shaft 96 is fixed within the boss 170 and projects laterally outwardly therefrom. A rocker element 174, best shown in Fig. 5, is pivotally mounted upon the shaft 172 in overlying relationship with respect to the passages 154 connecting the interior of the housing 20 with the suction lines 42. Each end of the rocker member 174 has loosely secured thereto a valve member 176, the relation of the parts being such that when the rocker arm 174 is pivoted in one direction so as to bring one of the valves 176 into sealing relation with respect to the corresponding passage 154, the other valve 176 is lifted from its passage 154 so as to open the latter passage to the interior of the casing 20.

The rocker 174 with its valves 176 is caused to alternately pivot in opposite directions by means of the following mechanism. An arm member 178 is pivotally connected by means of a pin 180 to a side face of the casting 92 of the compressor for swinging movement in a vertical plane. The upper end of the arm 178 is bent laterally and then downwardly to provide a downwardly directed projection 182. The rocker 174 is provided with an upwardly directed projection 184 midday between the ends thereof and with the point thereof lying in a plane including the axis of the shaft 172 and arranged in substantially perpendicular relation with respect to the general plane of the rocker 174. A coiled spring 186 extends between and is maintained under compression between the projections 182 and 184. The arm 178 is provided with an elongated aperture 188 therein within which aperture is received a cam 190 mounted for rotation therein in a manner which will hereinafter be fully explained. Upon rotation of the cam 190 from the position indicated in Fig. 5 the point of the cam 190 in turning will eventually strike against the lefthand side of the slot 188 and cause the arm 178 to be pivoted in a counterclockwise direction of rotation, as viewed in Fig. 5, until the projection 182 thereof passes over to the left of a plane including the axis of the shaft 172 and the point of the projection 184, whereupon the force of the spring 186 will cause the rocker 174 together with the valves thereon to pivot in a clockwise direction of rotation as viewed in Fig. 5 about the axis of the shaft 172 and will raise the lefthand valve 176 and move the righthand valve 176 downwardly into sealing relation with respect to the corresponding passage 154, the movement of the arm 178 to the left or in a counterclockwise direction as viewed in Fig. 5 being limited by the righthand wall of the slot 188 striking against the cam 190. Continuing rotary movement of the cam 190 will thereafter gradually cause the arm 178 to pivot in a clockwise direction of rotation about its pivot pin 180 until the point of the projection 182 passes to the right of a plane including the axis of the shaft 172 and the point of the projection 184 at which time the force of the spring 186 will cause the parts to resume the position shown in Fig. 5. As will be apparent this mechanism constitutes a snap mechanism operated through rotation of the cam 190 to alternately cause the valves 176 to be snapped between open and closed positions with respect to their respective passages 154.

In order to operate the cam 190 so that the time of activity of each of the evaporators 40 will be sufficient to cause freezing of a desired thickness of ice or a desired maximum limit of frost accumulation and to insure melting of the ice or frost thus formed during each inoperative period of each of the evaporators 40 the following mechanism is provided. Secured on the shaft 96 immediately above the boss 94 by means of a pin 200 passing through the hub portion thereof and the shaft 96 is a single lead worm 202.

This worm 202 is shown as being of a more or less hypoid type and may be considered as one end portion only of a conventional Hindley worm. The worm 202 is arranged in meshing relationship with a gear 204 arranged with its axis in a horizontal plane and rotatable with its shaft 206, best shown in Fig. 3, having bearing in a suitable boss 208 formed on the upper face of the top member 92 of the pump 22. The opposite end of the shaft 206 is formed to provide a single thread worm 210 thereon. It will be noted from an inspection of Fig. 3 that the bore in the boss 208 for the shaft 206 is enlarged at the worm end of the shaft and the corresponding end of the worm 210 projects into such enlarged bore portion for a purpose which will hereinafter be more clearly brought out.

The projecting end of the worm 210 lies in meshing relationship with a helical gear or worm wheel 212 fixed to a shaft 214 extending at a slight angle downwardly and to the right as viewed in Fig. 2 and which is provided with suitable bearings in a boss 216 formed on a side face of the top 92 of the pump 22. The end of the shaft 214 opposite the worm wheel 212 is provided with a single thread worm 218 which lies in meshing relationship with respect to a helical gear or worm wheel 220 freely rotatable upon the outer end of the fixed shaft 172 outwardly of the arm 178 and to which gear or worm wheel 220 the cam 190 is fixed for equal rotation therewith. The train of gears thus provided between the shaft 96 of the motor 98—100 and the gear 220 to which the cam 190 is secured preferably provides a gear reduction of such nature that the cam 190 will make one complete revolution during each sixty or more minutes of continuous operation of the motor 98—100. The figures selected in the design shown is eighty minutes which is suitable for one particular arrangement of refrigerating mechanism of the type shown, but obviously this figure may be varied by varying the ratio of the gear train described to obtain any desired ratio of movement between the driving motor and the cam 190.

Lubrication of the moving parts of the compressor unit is accomplished in the following manner. As in substantially all refrigerating systems a quantity of lubricating oil is introduced into the system and in the present case the lower part of the casing 20 provides a reservoir for the main body of lubricating oil which is indicated at 230. The lubricating oil 230 is of such a depth as to immerse the lower portion of the worm wheel 212 therein so that the worm wheel in rotating will carry oil up with it into contact with the worm 210. The pitch of the worm 210 is preferably such in relation to its direction of rotation that oil deposited thereon will tend to be carried towards the top of the sheet as viewed in Fig. 3 and into the enlarged portion of the bore for the shaft 206. The oil which is carried into the bore in the boss 208 for the shaft 206 will, of course, provide lubrication for the shaft 206. Additionally, it will be noted from an inspection of Figs. 2 and 3 that a pocket 232 is provided in the upper face of the casting 92 of the compressor into which pocket 232 the lower portion of the worm wheel 204 projects. The boss 208 is provided with an oil lead 234, indicated in Figs. 2 and 3, which leads from the junction of the large and small portions of the bore in the boss 208 for the shaft 206 into the pocket 232 and thus provides a means whereby the pocket 232 is filled with oil. The worm wheel 204 in rotating carries oil upwardly therewith and into contact with the worm 202, thereby to lubricate the rubbing faces between the worm 202 and worm wheel 204. Further, as illustrated in Fig. 2 the periphery of the worm wheel 204 extends into almost contacting relation with respect to the outer surface of the boss 94 on the cover plate 92 and adjacent this point of almost contact the boss 94 is provided with a downwardly and inwardly extending passage 236 the edges of which are adapted to wipe off lubricant from the periphery of the worm wheel 204 which as will be understood will be rotating at a fair speed of rotation and, therefore, tend to throw the oil thereon to the outer periphery thereof, and in this manner oil is carried to the bearing in the boss 94 for the shaft 96. The oil passing into the passage 236 will, of course, lubricate the upper bearing of shaft 96 and be carried on downwardly into the pump whereby to effect lubrication of the wearing surfaces thereof. Additionally, it will be understood, of course, as in all conventional constructions the refrigerant will carry a certain amount of entrained lubricating oil along with it in circulating through the system and this, together with the movement of the parts in the housing 20, will tend to create a certain amount of oil vapor in the housing 20 which will be drawn into the compressor 22 through the inlet passage 130 and thus provide an additional supply of lubricant for the working parts of the pump.

In Fig. 10 a modification of the above described motor compressor unit is shown illustrating a preferred construction thereof not particularly designed for use in connection with parallel evaporators such as the evaporators 40 in the previous views. As will be apparent under such circumstances, it is not necessary to provide any control means for the alternated connection of a pair of suction passages with the interior of the casing, and consequently the gearing previously described for the operating cam 90 may be dispensed with, but in such cases a different type of oiling system must be provided.

Referring to Fig. 10 in which parts corresponding to the parts previously described are indicated by the same numerals except that such numerals bear a prime mark, the casing 20′ instead of being welded to the base plate 80′ as in the previous construction is provided with an out-turned marginal flange 250 overlying the peripheral portion of the base plate 80′ with the interposition of a suitable gasket therebetween. Studs 252 secured in the marginal portions of the base plate 80′ project up through the flange 250 and receive thereon nuts 254 for the purpose of drawing the flange 250 into sealing relation with respect to the base plate. Nuts 255 are preferably threaded upon the downwardly projecting ends of the studs 252 below the base plate 80′ and preferably three equally angularly spaced studs 252 are further provided with lock nuts 256 below the nuts 255 onto the periphery of which the upper ends of coil springs 258 are threaded. The coil springs 258 serve as a resilient support for the motor compressor unit.

In this case the base 80′ instead of having a flat upper surface is provided with a raised central portion 259 providing an oil sump between its periphery and the casing 20′ in which the oil 230′ is received. It will be noted that the level of the oil 230′ is below the upper edge of the portion 259. The tube 262 having one end open to the oil 230′ in the sump extends upwardly therethrough and projects through the wall of the tube 260 where its end is bent in the direction of the refrigerant flow therethrough, and the walls of the tube 260 in approximate transverse alignment with the upper end of the tube 262 is preferably compressed inwardly as at 264 to effect a venturi so that the flow of refrigerant through the tube 260 will create a sufficiently low pressure at the discharge end of the tube 262 to cause oil to be drawn through the screen 266 and up from the sump to be discharged into the tube 260.

The boss 94′ of the top plate 92′ of the pump is provided with an upward opening depression 268, the bottom portion of which is connected by a passage 270 in the boss 94′ with the surface of the shaft 96′ therein. The end of the tube 260 is extended over the depression 268 so that oil discharged from the tube 260 with the refrigerant will be deposited in the depression 268 and, therefore, be led to the bearing surface for the shaft 96′ and be carried thereby downwardly into the gear section of the pump and the lower bearing for the shaft 96′ in the base plate 80′. Although a suction port similar to port 130 previously described may be provided for conducting refrigerant from the interior of the casing 20′ to either or both pairs of the gears 86′ and 88′, in the present case a portion of the top plate 92′ is broken away so that a relatively large area of the top of one of the gears 88′ is exposed directly to the space within the housing 20′, and the refrigerant within the housing 20′ is, therefore, fed to the spaces between the teeth of the gear 88′ directly, as at 272, instead of through a separately formed suction passage. Where the gear 86′ and only one gear 88′ is employed, and the tube 260 forms the sole suction conduit for the refrigerating system, all of the refrigerant circulated in the system will be introduced to the pump through the ends of the tooth spaces at 272. Where two separate evaporators are employed, for instance, as in the case where the evaporator 54 and only one of the evaporators 40 previously described, or a similar arrangement, the suction tube 260 will, of course, be connected to only one of the evaporators, and the suction line for the other evaporator will be brought up through the bottom of the base plate 80′ in a manner equivalent or similar to that described in connection with the preceding figures.

One feature of the present invention is brought out in Fig. 10, and that is in connection with means for preventing excessive amounts of lubricating oil from passing through the compressor. This feature comprises the provision of an opening such as 274 leading through the wall of the compressor shown in Fig. 10, as through a wall of the body 84′ and opening to the lower peripheral portion of that gear 88′ which co-operates with the gear 86′ to draw refrigerant from the interior of the casing 30′ and thereafter compress it. The provision of such an opening 274 would not be applicable to the pump formed by the gear 88′ and gear 86′ drawing the refrigerant through the bottom plate independently of the casing 20′ where the casing 20′ also serves as a part of a refrigerant flow path for a separate evaporator, but where the compressor comprises merely a pair of gears having a single suction port, or three gears having their suction ports combined then all of the gears may be provided with openings equivalent to the openings 274. The openings 274 may connect with the lower tooth portions of such gears and preferably extend outwardly from the outer edges of the co-operating gears so that lubricating oil trapped between the teeth of the gears and carried by gravity to the lower edges thereof will be either wiped off or thrown off under centrifugal force into the passages 274 and discharged from the pump, thus forming a centrifugal oil separator and preventing any material amounts of oil from being carried through the system outside of the compressor.

Formal changes may be made in the specific embodiment of the invention disclosed without departing from the spirit or substance of the broad invention, the scope of which is commensurate with the appended claims.

What I claim is:

1. In a refrigerating mechanism, in combination, refrigerant condensing means provided with independent suction ports and adapted to simultaneously exert independent suction effects therethrough, a pair of evaporators, means for delivering refrigerant from said condensing means to said evaporators in parallel including refrigerant regulating means controlling the flow of refrigerant to one of said evaporators and to a second refrigerant regulating means in series with the first-mentioned regulating means and with the other of said evaporators, a suction duct connecting one of said evaporators to one of said suction ports, and a separate suction duct connecting the other of said evaporators with the other of said suction ports.

2. In a refrigerating mechanism, in combination, refrigerant condensing means provided with independent suction ports and adapted to simultaneously exert independent suction effects therethrough, a pair of evaporators, means for delivering refrigerant from said condensing means to said evaporators in parallel including refrigerant regulating means controlling the flow of refrigerant to one of said evaporators and to a second refrigerant regulating means in series with the first-mentioned regulating means and comprising a weighted valve device connected with the other of said evaporators, a suction duct connecting one of said evaporators to one of said suction ports, and a separate suction duct connecting the other of said evaporators with the other of said suction ports.

3. In a refrigerating mechanism, in combination, a sealed housing, a compressor, a part of said compressor forming a closure for said housing, said compressor having a pair of independent suction ports one drawing vapor from inside of said housing and one located in a wall of said compressor at a point exposed outside of said housing, and a pair of independent suction ducts for delivering refrigerant to said suction ports, the interior of said housing forming a portion of one of said suction ducts.

4. In a refrigerating system, a compressor so constructed and arranged that gas from the discharge side may return to the suction side thereof after said compressor has stopped, a motor for driving said compressor, a condenser into which said compressor is adapted to discharge compressed refrigerant, a duct connecting said compressor and condenser for the passage of said refrigerant, and a check valve located in said duct to prevent flow of vapor from said condenser to said compressor in a reverse direction, said duct being so constructed and arranged in that portion thereof between said compressor and said check valve as to provide a sufficient volume for compressed refrigerant to permit said motor upon starting to approximately reach its running speed before the pressure of the refrigerant delivered by the compressor to said portion of said passage during said starting equals the pressure of the refrigerant in said condenser.

5. In a refrigerating system, a compressor so constructed and arranged that gas from the discharge side may return to the suction side thereof after said compressor has stopped, a motor for driving said compressor, a condenser into which said compressor is adapted to discharge compressed refrigerant, a duct connecting said compressor and condenser for the passage of said refrigerant, a check valve located in said duct to prevent flow of vapor from said condenser to said compressor in a reverse direction, said duct being so constructed and arranged in that portion thereof between said compressor and said check valve as to provide sufficient volume for compressed refrigerant to permit said motor upon starting to approximately reach its running speed before the pressure of the refrigerant delivered by the compressor to said portion of said passage during said starting equals the pressure of the refrigerant in said condenser, and means for trapping oil in an intermediate portion of said duct portion in such a manner that it will be returned to said compressor during the idle periods of said compressor.

6. In a refrigerating system, a compressor and a motor, a gas tight housing enclosing said compressor and motor, said housing having a pair of suction passages leading thereinto, valve means for alternately opening and closing one of said passages as it closes and opens the other of said passages, and means driven by said motor actuating said valve means, said compressor having an inlet port open to the interior of said housing.

7. In combination with a refrigerating system, a compressor comprising a housing, a train of three gears in said housing, means for driving said gears, said housing providing discharge ports located adjacent the points where the teeth of mating gears begin to engage and suction ports for introducing gas between the teeth of said gears, a pair of evaporators, means connecting said evaporators with said discharge ports, means connecting one of said evaporators with one of said suction ports, and means independent of the last-mentioned means connecting the other of said evaporators with the other of said suction ports.

8. In a refrigerating system, a compressor, a motor having a driving connection with said compressor, a sealed housing enclosing said driving connection, a plurality of evaporators, suction conduit means connected with the interior of said housing and with said evaporators, means for selectively connecting said evaporators with the suction side of said compressor through said conduit means, and power means driven by said motor for actuating said selective connecting means.

9. A compressor, an enclosure for suction gas connected therewith, valve means in said enclosure, and means for actuating said valve means with mechanical power derived from the operation of said compressor in a cycle materially longer than that of a compressor revolution.

10. In a refrigerating system, a pair of evaporators, a motor-compressor unit, a sealed housing enclosing said unit, means forming a pair of suction passages for conducting vaporized refrigerant from said evaporators, one connected to each of them, valve means for alternately opening and closing one of said passages as it closes and opens the other, and power means for actuating said valve means, said power means deriving its energy from a source enclosed in said housing.

11. In a refrigerating system, a motor-compressor assembly, a sealed housing enclosing the moving parts of said assembly, a plurality of suction conduits through which vapor may flow under suction produced by the compressor of said assembly, and means within said housing operable automatically as a result of the functioning of said system for intermittently stopping the flow of vapor through one of said conduits for a period of time considerably longer than that of a revolution of said compressor.

12. In a refrigerating system, a pair of evaporators each having a suction outlet conduit, a compressor adapted for drawing vapor from said evaporators through said suction outlet conduits thereof, said conduits being connected in parallel, and a condenser connected with said compressor for receiving vapor from both said evaporators after it has been compressed, said compressor being reversible during idle periods under the influence of refrigerant under pressure on its discharge side whereby to enable it to relieve itself of said discharge pressure during idle periods.

13. In a refrigerating system, a rotary compressor of the displacement type, a motor for driving said compressor, a sealed housing enclosing the moving parts of said motor and compressor and adapted to contain a refrigerant circulated in said system and a lubricant for said moving parts, and centrifugal means in said compressor for separating said lubricant from said refrigerant.

14. In a refrigerating system, a motor compressor assembly comprising a motor and a compressor and a driving connection therebetween, a gas-tight housing enclosing said driving connection and the moving parts of said motor and compressor, a refrigerant suction duct leading to said housing, a refrigerant suction duct leading to said compressor and open to the interior of said housing, and a refrigerant suction duct separated from both aforesaid suction passages and leading directly to a separate suction port of said compressor at an area thereof exposed outside of said housing.

15. In a refrigerating mechanism, in combination, a compressor, a motor, a driving connection between said motor and said compressor, a housing surrounding said motor and connection and sealed to said compressor with a face of said compressor exposed exteriorly of said housing and forming a gas-tight enclosure for said motor and connection, said compressor having a first suction port opening onto the interior of said housing and a second suction port opening onto the exterior of said face, said second suction port adapted to be connected to a source of flow of refrigerant, said compressor having a discharge passage opening onto the exterior of said face, and said housing having a suction passage opening through a wall thereof adapted for connection with a source of flow of refrigerant whereby to admit refrigerant therethrough into the interior of said housing, whereby said interior of said housing forms a part of a suction passage between said first suction port and the second mentioned source of flow of refrigerant.

16. In a refrigerating mechanism of the class wherein a high temperature evaporator and a low temperature evaporator are connected in parallel refrigerant circuits, the combination with said parallel evaporators of common means for effecting a flow of refrigerant therethrough comprising a compressor, a motor, a driving connection between said compressor and motor, a housing surrounding said motor and connection and sealed in gas-tight relation to said compressor leaving a face of said compressor exposed exteriorly of said housing, said compressor having a first suction port open to the interior of said housing and said housing having a port in the wall thereof for receiving the flow of refrigerant from said high temperature evaporator whereby the interior of said housing forms a part of the refrigerant passage between said high temperature evaporator and said suction port, said compressor having a second suction port opening onto the exterior of said face for direct connection to the other of said evaporators, and said compressor having a discharge port opening onto said face.

17. In a refrigerating system, a motor compressor unit, a chamber associated therewith, a plurality of evaporators each having a suction passage opening into said chamber, valve means in said chamber and valve actuating means for periodically opening and closing one of said suction passages as it closes and opens the other, and power means energized by the operation of said compressor for operating said actuating means.

GLENN MUFFLY.